United States Patent
Booth et al.

(10) Patent No.: US 9,822,023 B1
(45) Date of Patent: Nov. 21, 2017

(54) METHOD AND SYSTEM FOR WATER TREATMENT

(71) Applicant: Clean Water LLC, Charleston, WV (US)

(72) Inventors: Donald W Booth, Cross Lanes, WV (US); Tony L Anderson, Ripley, WV (US)

(73) Assignee: Clean Water LLC, Charleston, WV (US)

( * ) Notice: Subject to any disclaimer, the term of this patent is extended or adjusted under 35 U.S.C. 154(b) by 0 days.

(21) Appl. No.: 15/374,310

(22) Filed: Dec. 9, 2016

Related U.S. Application Data

(60) Provisional application No. 62/265,448, filed on Dec. 10, 2015.

(51) Int. Cl.
*C02F 1/52* (2006.01)
*C02F 101/12* (2006.01)
*C02F 103/10* (2006.01)

(52) U.S. Cl.
CPC .......... *C02F 1/5236* (2013.01); *C02F 1/5281* (2013.01); *C02F 2101/12* (2013.01); *C02F 2103/10* (2013.01); *C02F 2301/046* (2013.01)

(58) Field of Classification Search
CPC .................................................... C02F 1/5236
See application file for complete search history.

(56) References Cited

U.S. PATENT DOCUMENTS

| | | | | |
|---|---|---|---|---|
| 4,525,280 A | * | 6/1985 | Vasconcellos | ............ C02F 1/52 210/728 |
| 8,409,442 B2 | | 4/2013 | Booth | |
| 8,470,139 B2 | | 6/2013 | Booth | |
| 8,535,538 B1 | | 9/2013 | Keeling et al. | |
| 9,422,172 B2 | | 8/2016 | Booth | |
| 9,662,594 B2 | | 5/2017 | Booth | |
| 2013/0048562 A1 | * | 2/2013 | Keister | .................... C01D 3/06 210/638 |
| 2013/0284582 A1 | | 10/2013 | Booth | |
| 2016/0368783 A1 | * | 12/2016 | Ertel | ....................... C02F 1/048 |

\* cited by examiner

*Primary Examiner* — Peter Keyworth
(74) *Attorney, Agent, or Firm* — Dinsmore & Shohl LLP; Monika L'Orsa Jaensson, Esq.

(57) ABSTRACT

The disclosed technology regards a method and system for removing sodium chloride from production water or fracking water produced in an oil well operation, or other wastewater. Generally, the method includes adding a calcium chloride feed to the source water to create a mixture in an amount so that the calcium chloride present in the mixture is at least 31% w/w of the mixture. The mixture is then agitated, and settled to allow sodium chloride crystals to precipitate out of the mixture, leaving a calcium chloride mixture.

9 Claims, 7 Drawing Sheets

METHOD AND SYSTEM FOR WATER TREATMENT

BACKGROUND OF THE TECHNOLOGY

The disclosed technology regards a method and system for removing sodium chloride from wastewater. The disclosed technology further regards a method and system for treating wastewater from hydraulic fracturing.

Industries like the oil and gas industry generate high volumes of wastewater containing suspended solids, oil, impurities as well as sodium chloride and calcium chloride. Many of these industries generate high volumes of wastewater, which they dispose of by deep well injection or through wastewater treatment facilities. The cost of wastewater disposal and treatment is significant, and may be the source of recent earthquakes and other environmental concerns.

Of particular note, present methods and systems that treat wastewater to remove suspended solids, oil and other impurities, often generate additional sodium chloride and calcium chloride in the treatment of the water (this pretreated water with sodium chloride and calcium chloride is often referred to as 'salt brine'), and then remove sodium chloride from the water in the same step as clean water removal (by evaporation, distillation or otherwise). However, in doing so the sodium chloride may precipitate, which precipitate plugs the apparatus facilitating the removal of clean water, causing equipment damage and downtime for repair. Using the novel methods of the present technology, this problem is overcome by precipitating out the sodium chloride prior to moving the water into the concentrator system or other dewatering apparatus.

By means of the disclosed method and system, the sodium chloride is precipitated out of the salt brine and removed before the removal of clean water. The sodium chloride precipitate may be high purity sodium chloride (>98%), depending on the effectiveness of the pretreatment process applied, noting that any impurities that remain in the salt brine and a small amount of calcium chloride may precipitate with the sodium chloride or be present in the moist sodium chloride removed from the system and dried. The remaining calcium chloride in solution (after precipitation of the sodium chloride) may be captured for other uses, and/or dewatered and recycled through the methods and system of the disclosed technology. Clean water captured in the dewatering process may then be returned to the environment or used for other purposes. Because the remaining brine is substantially free of sodium chloride, the dewatering process may be easily controlled to avoid the plugging issues of the prior art.

Therefore, the disclosed methods and systems provide a less expensive means to pretreat and separate industrial wastewaters into various saleable or disposable products, including high purity sodium chloride crystals, liquid calcium chloride and clean water. Specifically, simpler and less expensive evaporators (e.g., plate and frame heat exchangers) or similar technology for dewatering the brine solution may be used by the systems and methods of the present technology because the sodium chloride has been precipitated out and removed from the brine before the dewatering process. It is also anticipated that by simplifying the removal of clean water from the salt brine, a multi-effect evaporator can be employed to decrease total system energy consumption costs.

GENERAL DESCRIPTION

The disclosed technology regards methods and systems for generally treating, and for removing sodium chloride from, production water or fracking water produced in oil well operations, or from other wastewater. Generally, the method includes (a) pretreating the source water, and (b) adding calcium chloride to the pre-treated source water to create a brine mixture, wherein the brine mixture comprises between about 31% w/w and 75% w/w calcium chloride. The brine mixture is then agitated to cause the sodium chloride to precipitate out of the mixture, and settled to allow precipitated sodium chloride crystals to settle out of the mixture.

The sodium chloride crystals are removed from the brine mixture, and the resulting calcium chloride solution may be sold, or dewatered and recycled as the calcium chloride feed of the processes of the disclosed technology. Clean water (low total dissolved solutes or demineralized water) resulting from such dewatering process may be returned to the environment or used for other purposes. To maintain a liquid form, the calcium chloride should not exceed 75% w/w at ambient temperatures (with higher concentration limits at higher temperatures) of the dewatered solution; at ambient temperatures, if calcium chloride is present at or above 75% w/w within solution, the solution may form into a solid or semi-solid.

One method for regulating the amount of calcium chloride in the pre-treated source water mixture and the dewatered calcium chloride solution is to measure the density and temperature of the mixture or solution, respectively. Further, measuring the density and temperature of the source water (after pretreatment, if any) allows the plant engineer to calculate the amount of concentrated calcium chloride to feed (independently measured for calcium chloride concentration) into the mixture, to achieve at least 31% w/w calcium chloride in mixture.

Depending on the quality of the source water and any purity requirements for the sodium chloride crystals, the source water may be pretreated before removal of the sodium chloride. Pretreatment methods may include, but are not limited to, desludging, de-oiling, pre-treatment and brine conditioning, chemical treatment, and combinations thereof.

Systems of the disclosed technology include in fluid communication (a) one or more reaction chambers for receiving and agitating a mixture of source water (after pretreatment, if any) and calcium chloride feed, wherein sodium chloride is precipitated out of the mixture by the processes of the disclosed technology, (b) a settling chamber or bed for facilitating settlement of precipitated sodium chloride from the mixture, and (c) a dewatering apparatus, such as a frame and plate heat exchanger, to receive and dewater the calcium chloride solution. As hereinabove discussed, various components of the system may include means to determine the density and temperature of the solutions prior to delivery to the reaction chamber, while in the chamber, while in the dewatering apparatus, and at other stages of the process. Further, systems of the disclosed technology include means to collect the sodium chloride crystals from the settling chamber (e.g., a centrifuge), pumps and valves to control fluid flow through the system, and sensors which assess the operating conditions of the various components of the system.

When pretreatment of source water is desirable or necessary, the system further comprises a plurality of pretreatment assemblies in fluid communication, as necessary to treat the source water prior to delivering it to the reaction chamber(s). Pretreatment assemblies, embodiments of which are hereinafter described, may include desludging assemblies, de-oiling assemblies, pre-treatment and brine conditioning assemblies, and chemical treatment assemblies.

DESCRIPTION OF THE FIGURES

A better understanding of the disclosed technology is believed to be available upon review of the accompanying drawings, in which.

DETAILED DESCRIPTION

The disclosed technology includes a method of removing sodium chloride from water (hereinafter referred to as 'source water'), wherein the source water is mixed with calcium chloride to form a salt-water mixture having a calcium chloride concentration of between about 31% w/w and 75% w/w; in some embodiments, the mixture comprises 35%-48% w/w calcium chloride. The salt-water mixture is agitated to cause the sodium chloride to precipitate from solution, and then settle to allow the precipitated sodium chloride crystals to settle and be removed from the mixture, resulting in a calcium chloride solution. The disclosed technology further includes a system that removes sodium chloride from source water, using the methods as herein described. Furthermore, methods and systems of dewatering the resulting calcium chloride solution for other use or recycling through the system, and for capturing clean water, are also provided. In some embodiments the disclosed technology further regards a system to pre-treat source water to remove suspended solids, oils and impurities prior to the removal of sodium chloride and subsequent capture of clean water.

Figure 1:
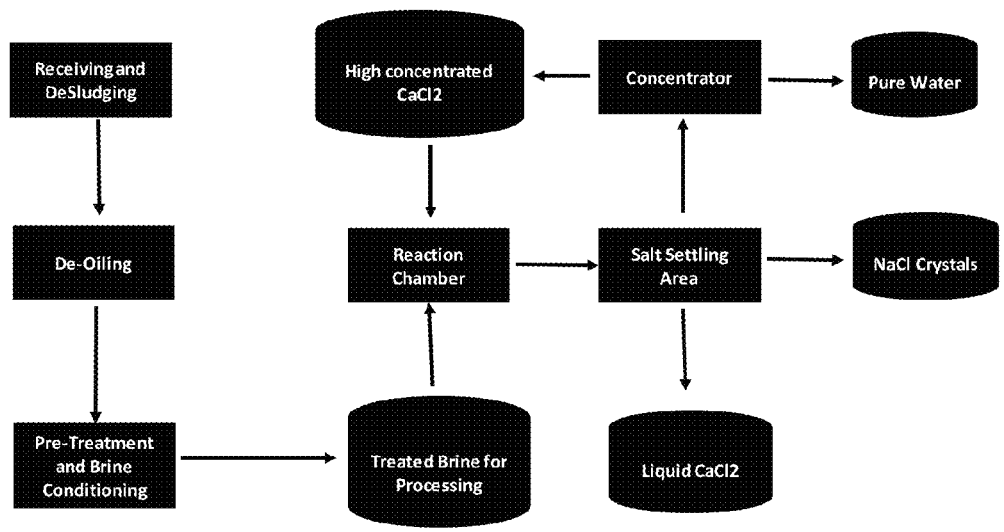
FIG. 1 is a process flow diagram of an embodiment of the disclosed technology.
Figure 2:
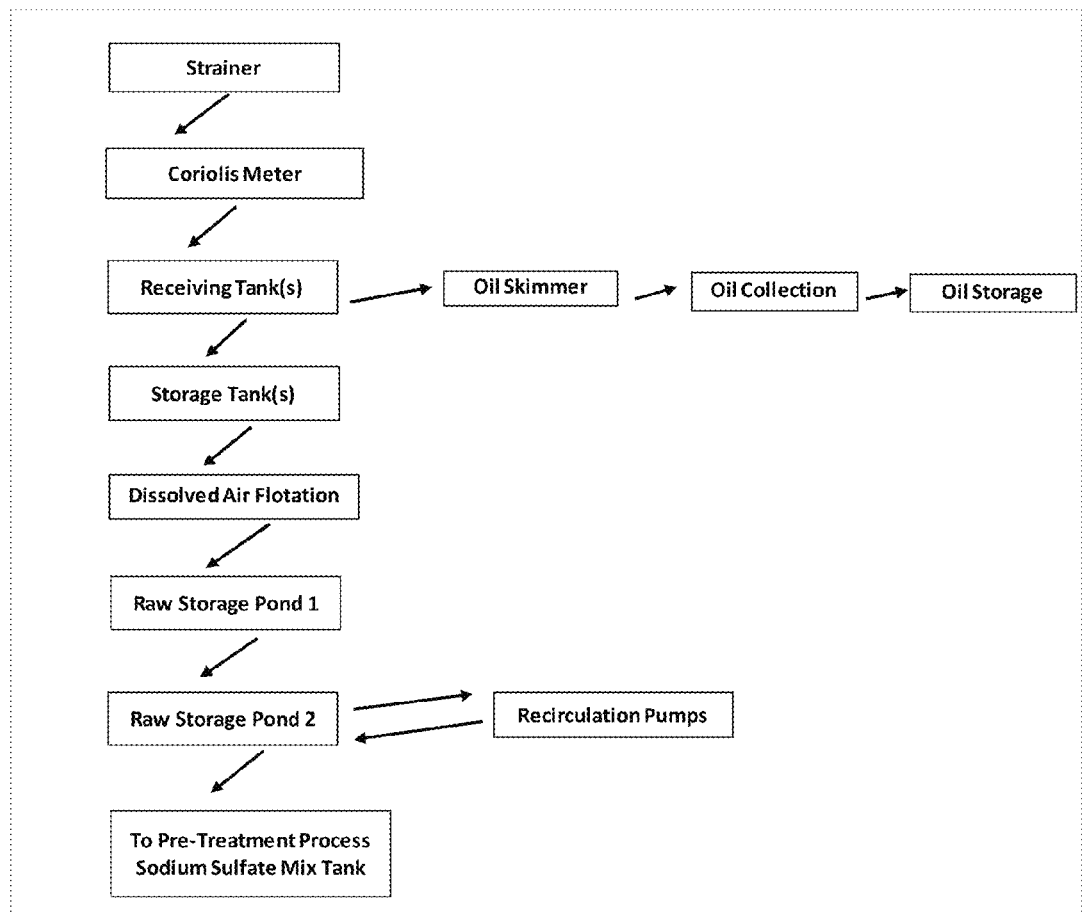
FIG. 2 is a process flow diagram through components of the desludging and de-oiling pretreatment processes of an embodiment of the disclosed technology.

As shown in FIG. 1, the method of the disclosed technology for removing sodium chloride from source water includes adding calcium chloride to the source water (which may be pretreated) so that the calcium chloride is present in the mixture at between about 31% w/w and 75% w/w, or about 35%-48% w/w. Frequently the source water will include some calcium chloride; additional calcium chloride (provided as liquid calcium chloride, calcium chloride pellets, or from recycled dewatered/concentrated calcium chloride solution resulting from the methods of the present technology) is added to the mixture to achieve this necessary range in mixture.

Figure 7:
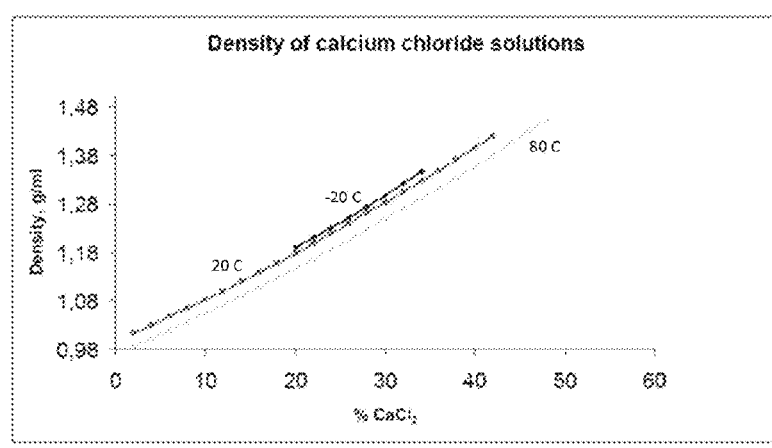
FIG. 7 shows calcium chloride concentration in a water mixture, based upon density and temperature measurements.

To facilitate the necessary calcium chloride concentration in the mixture, the source water and the calcium chloride feed may each be measured for percentage of calcium chloride. Calcium chloride in either solution may be determined by measuring the density and temperature of the solution, as shown in FIG. 7. Similar methodology to measure the calcium chloride concentration in solution by, for example, measuring the temperature, the density and/or sonic velocity of the mixture, may be used to ensure that the percentage of calcium chloride in the mixture stays at or above the necessary range (noting that additional calcium chloride should be provided to the mixture as necessary to maintain this range).

The mixture is then agitated (thoroughly mixed) for a short period of time, typically one to five minutes, to allow sodium chloride to precipitate from the solution; longer agitation times are desirable when the calcium chloride is at or near 31% of the mixture and temperatures are low, while shorter agitation times will provide adequate results when the concentration of calcium chloride in the mixture is higher, or the mixture is at a higher temperature.

Once the mixture is agitated, it should settle to allow the precipitated sodium chloride crystals to settle out of the mixture. The settling time should allow for full precipitation of sodium chloride crystals from solution; during the settling time the calcium chloride should be maintained at between about 31% w/w and 75% w/w of solution, or 35% to 48% w/w of solution. In some embodiments the mixture will settle for 30-50 minutes to maximize settling of the precipitate.

Once the precipitated sodium chloride crystals have settled out of the mixture, the same may be removed and stored for resale or other purposes. The remaining liquid mixture is a diluted calcium chloride solution. A portion of this remaining mixture may be dewatered or concentrated and recycled through the method and system of the disclosed technology; the remainder of the mixture may be captured for other purposes. Typically the diluted calcium chloride solution has concentration of calcium chloride of between about 32% and 35% w/w.

The portion of the calcium chloride mixture that is recycled through the system and method of the present invention may then be pumped or transferred to a dewatering apparatus, which removes some water from the mixture. To avoid solidification of the calcium chloride mixture, the amount of calcium chloride in the mixture should not exceed 75% w/w of a solution (in some embodiments, this is between about 43%-55% w/w, or about 48%), at ambient temperatures (a higher percentage of solution may be achievable under higher temperature conditions, without the mixture solidifying). It is noted that the concentrating process does not rely on one specific range of temperatures and concentration to eliminate calcium chloride crystals forming. This variability allows for economics to be applied when determining feasibility of this process for treating mix brine solutions. For example, heat sources that are not currently being harnessed from other processes could be used, like ambient steam. This would result in different concentrating conditions than high pressure steam opportunities.

It is important to note that the pre-treated source water arrives in batches, and can vary in total salt concentration and the amount of the sodium chloride compared to the calcium chloride which make up the total salt concentration. Therefore, it is important to create a homogeneous pre-treated source water batch so that these variations between batches do not affect the precipitation of sodium chloride provided in the process. Critical to the process is determining the ratio for mixing the concentrated calcium chloride feed and the pretreated water source, determined from the calcium chloride's concentration percentage and temperature in the feed and the salt and calcium chloride concentration in the source. Data from ICP analysis and lab tests are helpful to determine this ratio, noting that lab tests can overcome the effect of minor impurities on the ratios.

In an embodiment of a system of the disclosed technology to remove sodium chloride from source water (shown in FIG. 6), one or more reaction chambers 101 are provided to receive the mixture of source water (feed 1011) and calcium chloride (feed 1012). When a plurality of reaction chambers are provided, they may be provided in series so that the mixture from the first reaction chamber is delivered to the mixture of the second reaction chamber, and wherein each maintains calcium chloride concentration of between about 31% w/w-75% w/w. In some embodiments the source water and the calcium chloride are delivered to the reaction chamber by a pump or other means, through tubing that is lined or made from a material that will not corrode in the presence of sodium chloride or calcium chloride, such as ceramic-lined or Teflon-line tubing, or plastic tubing.

This embodiment of the system may further include one or more density meters, differential meters, coriolis meters, or sonic velocity meters, or any combination thereof, and a thermometer, in the reaction chamber(s) and/or in a tank or line which provides the source water and the calcium chloride feed to the system. By these devices, the amount of calcium chloride within the mixture can be controlled, monitored and adjusted. No heat or pressure is required for this process; however, the presence of heat (such as may be provided in the calcium chloride feed from the evaporator or distiller, or vacuum or non-vacuum concentrating systems, as hereinafter described) may cause the sodium chloride crystals to develop more rapidly.

The reaction chamber(s) can operate continuously, with the source water and calcium chloride source being added at ratios so that calcium chloride is maintained at a concentration of between about 31% w/w and 75% w/w in solution. Agitation is provided by, for example, inline mixers or rotating blades 104 operating at 30-50 rpm, for about 2.5 minutes agitation time, or otherwise as necessary to create a homogeneous mixture. Mixed solution with precipitated sodium chloride are removed from the reaction chamber(s) by hydrostatic pressure.

In some embodiments of the disclosed technology a second reaction chamber may be provided in series with the first reaction chamber, to facilitate full precipitation of sodium chloride from solution.

Figure 6:
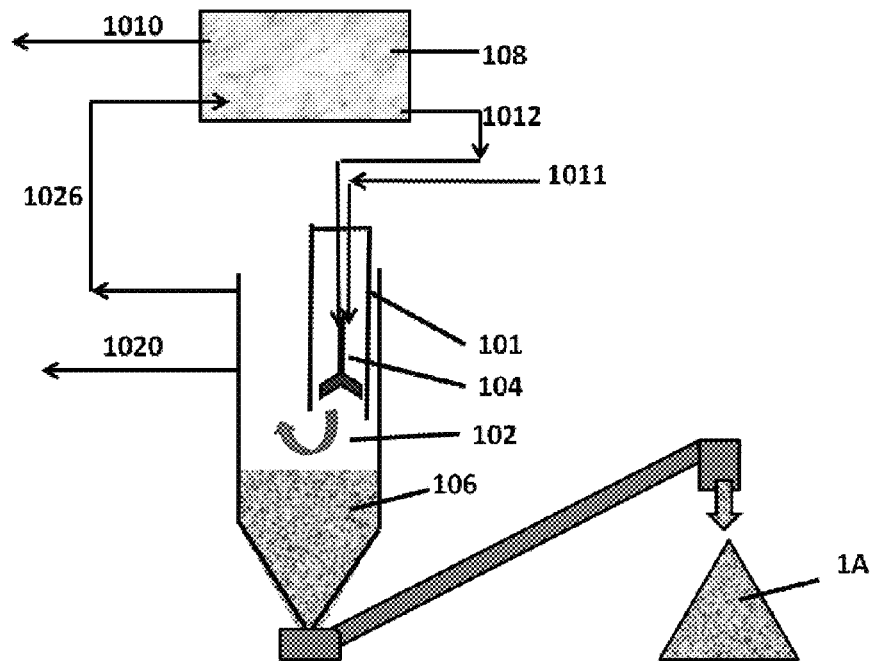
FIG. 6 is a process flow diagram of the reactor/clarifier system of an embodiment of the disclosed technology.

In fluid communication with the reaction chamber(s) is a settling chamber or clarifier 102, which may be provided as part of a unit comprising the reaction chamber (such as shown in FIG. 6), or as a separate unit. The settling chamber may include an auger (e.g., a tube auger 106), a pump and centrifuge, or other means to remove the solid sodium chloride, and a conveyor may be provided to transport the solid sodium chloride to a storage bin. The settling chamber may further include means to capture diluted calcium chloride solution by overflow; alternatively, one or more pumps, hydro-cyclone or otherwise, may be provided in fluid communication with the settling chamber to withdraw the calcium chloride solution therefrom. In some embodiments the settling chamber comprises multiple ports to separate diluted calcium chloride for sale and for recycling through the system. To maintain the calcium chloride in solution at the necessary range (31-75% w/w), the settling chamber may also be in fluid communication with the calcium chloride feed. The settling chamber 102 may be jacketed to assist in cooling the diluted calcium chloride solution to reach the design solution temperature (70-150° C.). A second settling chamber in fluid communication with the first settling chamber (in some embodiments in cascading structures) may be incorporated to insure design temperature is reached.

Dewatering apparatus 108 useful in the disclosed technology to remove water from the resulting calcium chloride mixture 1025 include a single- or multi-effect flash evaporator, a multistage vapor compressor, means for applying a direct flame into the mixture, means for absorbing water into air, means for flowing heated air across or into the mixture, and/or means for heating and flowing air across the mixture. In a preferred embodiment, hot oil is used as the heating source. Simpler means such as plate and frame heat exchangers may also be used. Each of these systems heat the diluted calcium chloride mixture until steam is created, which can be condensed and collected as clean water 1010 by means of a condenser; in other embodiments the steam is used for other purposes or released into the environment.

A source water feed pump is useful to transfer the fluid from homogeneous pretreated brine tanks to the reaction chamber 101; a diluted calcium chloride pump is also provided to transfer diluted calcium chloride solution from the clarification chamber 102 to the calcium chloride dewatering apparatus 108. Coriolis meters may be coupled with the source water feed tank, the concentrated calcium chloride feed tank, and/or the reaction tank, to measure the calcium chloride in each tank; furthermore, a programmable control valve may be provided to regulate the pretreated source water and concentrated calcium chloride mixing ratio delivered to the reaction chamber.

In embodiments where diluted calcium chloride is stored for resale or later use, after removal from the settling chamber 102, the diluted calcium chloride 1020 is circulated by a pump to provide mixing with clean water, to further dilute the mixture to at least 32% w/w, or between about 30-34% w/w, calcium chloride. A density meter may be used to determine the amount of water to be added to achieve the appropriate ratio, and a level controller may be used to pump the calcium chloride solution to a storage tank. In this range any trace sodium chloride in solution is inhibited from precipitating out of solution as ambient temperature may drop; further, calcium chloride solutions outside of this range may start freezing at varying temperatures.

In the embodiment of the apparatus shown in FIG. 6 a main chamber is an open top steel tank. This main chamber is ceramic lined and coated to prevent corrosion. The size of this chamber will vary due to volume requirements. This main chamber includes a smaller homogenous reaction chamber 101, having one or more bladed mixer(s) 104 and two inlet piping connections 1011, 1012, for receiving source water and calcium chloride solution, respectively. The reaction chamber 101 has an open bottom, allowing all solids to drop into the settling tank 102 of the main chamber. The settling tank is coupled with (1) a horizontal auger 106, facilitating removal of the sodium chloride particulate 1A from the settling chamber, to a water tight collection box, and (2) a vertical auger rising to above the main chamber waterline, for discharging calcium chloride solution. The main chamber further comprises an over flow weir installed with a pipe connection for discharging calcium chloride solution. Four additional pipe connection(s) on the side of the clarifier are provided for instrumentation and control.

In practice of the methods and operation of the system of the disclosed technology, it is desirable to use two or more treated source water tanks to ensure consistency of source water composition, wherein one tank is feeding into the reaction chamber while another is being tested to determine the unique mixing ratio for the second tank. Depending on pretreatment and process timing, a third tank may be needed to allow for proper testing to develop the mixing ratios.

In an embodiment of using the above-described system, the ratio for the mixing of the concentrated calcium chloride feed with the specific batch of pretreated source water is calculated as hereinabove described, and input into a control system which will control the amount of each liquid input into the reaction chamber. The concentrated calcium chloride and the pretreated source water are pumped and metered into the reaction tank at the determined ratio. The reaction section of the tank is a chamber within the main tank which has an agitator to ensure proper mixing of the two liquids. Sodium chloride crystals precipitate out of solution, and fall to a clarification section of the tank, where they are removed by either the auger or the pump and centrifuge combination, while at least a portion of the dilute calcium chloride liquid from these separation processes is dewatered and returned to the reaction tank. Notably, the dampness of the sodium chloride crystals contains calcium chloride solution, so there is a minimum level of calcium chloride required in the pretreated source water, or from another calcium chloride source, to make up for loss in the crystal dampness.

In some embodiments of the disclosed technology, such as where the source water is production or fracking water from oil well operations, and in other industrial operations producing wastewater and sewage, pretreatment of the water to remove suspended solids, oil and impurities may be desirable before removing the sodium chloride. As shown in the embodiments of FIG. 1, depending on the state and condition of the water, this pretreatment may include multiple treatment methods, such as desludging, de-oiling, pre-treatment and brine conditioning, or chemical treatment processes, or any combination thereof, in fluid communication (by means of pipes, augers, troughs, and/or overflow tank designs). Other methods of pretreating the wastewater may be used with the disclosed technology.

Desludging of the water is helpful in removing suspended solids, and may be accomplished by straining and/or settling the water. One or more strainers, such as basket strainers, are useful in this process step.

De-oiling of the water is beneficial to remove free oil from the water, and may be accomplished by known systems providing gas flotation, media absorption (e.g., walnut shells, activated carbon, etc.), ultra-filtration, oil water screen filtration, membrane separation, heat treatment and/or centrifuges. Oil skimmers such as adhesion-style skimmers may also be used to remove oils from the surface of the water. In an embodiment, the oil skimmers are located on top of one or more water storage tanks. Oil collection pumps receive the oil collected by the skimmers and pump it to an oil storage tank for sale or other use.

A dissolved air flotation (DAF) unit, such as an air-entrainment system, may receive the source water (after desludging and de-oiling treatment) and remove additional suspended solids and other organics, such as silt and surfactants.

One or more storage tanks or ponds may be incorporated into the system of the disclosed technology to store the water before or during various pretreatment processing stages as hereinabove described. A final tank or pond holds the pre-treated water comprising sodium chloride and calcium chloride for delivery to and mixing in the reaction chamber as hereinabove described. A recirculation pump may be included in this final tank or pond (and any of the other tanks or ponds) to ensure a homogenous fluid.

Other pre-treatment and brine conditioning may be necessary when the sodium chloride removed from the water is intended for another use, and must meet certain quality specifications, or to address water disposal requirements set by local, state or federal standards, and may be performed by the methods of electrocoagulation, chemical precipitation, chemical oxidation, sulfate treatment, and pH adjustment, as hereinafter described. The pre-treatment process is critical to both conditioning the fluid for process reaction and product quality, removing all total dissolved solids (TDS) and dissolved organics (e.g. surfactants), as well as exchanging cations to sodium and/or calcium, and anions to chlorides.

In identifying and measuring the impurities in source water (which varies between batches), an Inductively Coupled Plasma (ICP) analyzer is helpful. Further helpful is laboratory testing of raw and pretreated water. By these devices and methods one can determine (i) impurities in the raw water (e.g., barium and strontium) and w/w % of chemicals (e.g., sodium sulfate, calcium hydroxide, sodium hydrochloride) required to remove the impurities; and (ii) concentration of calcium chloride and total salts in pre-treated water and w/w % of calcium chloride required to precipitate the sodium chloride. By such measuring and testing prior to pretreatment and salt removal, the process can be tailored for each batch of water to ensure removal of impurities (by means of the methods hereinafter described) and precipitation of sodium chloride (by means of the methods hereinabove described), wherein the % w/w of chemical or calcium chloride required in the applicable process of the system may be extrapolated.

Figure 3:
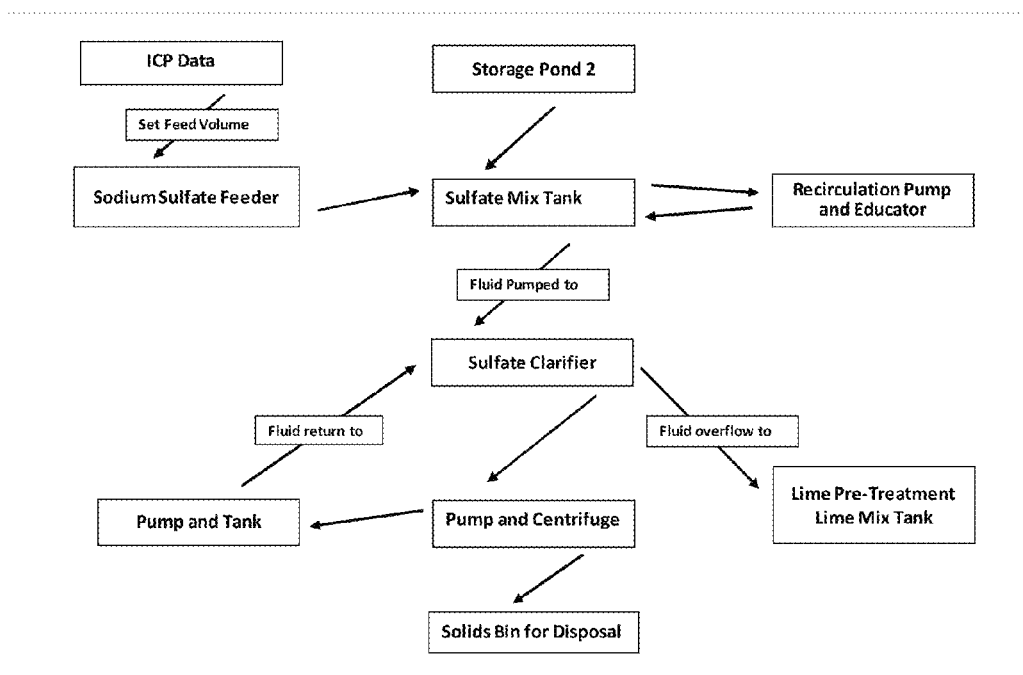
FIG. 3 is a process flow diagram through components of the sulfate pretreatment process of an embodiment of the disclosed technology.

When chemical treatment is desirable, a chemical mix tank, such as a sodium sulfate mix tank, receives (by transfer pumps) batch raw water (filtered and de-oiled, if necessary), as shown in FIG. 3. A chemical feeder may be set to dispatch the proper amount of chemical into the mixing tank based upon the volume of raw water received, wherein the amount of chemical may be determined based upon the ICP readings and laboratory testing on the water batch, as hereinabove described. A mixing pump and eductors circulate the tank to mix and provide the agitation to react the impurities (e.g., barium and strontium) with the selected chemical (e.g., sodium sulfate), causing precipitation of the impurity (e.g., insoluble barium sulfate and strontium sulfate). A feed pump and clarifier may be incorporated into the unit to empty the chemical mix tank and separate the treated water from the precipitate solids, while a pump and centrifuge remove the solids by circulating fluid from and back to the centrifuge, and the centrifuge drops the solids into a storage bin for other use or disposal. Overflow design of the chemical mix tank may also allow removal of the chemically pretreated water.

Figure 4:
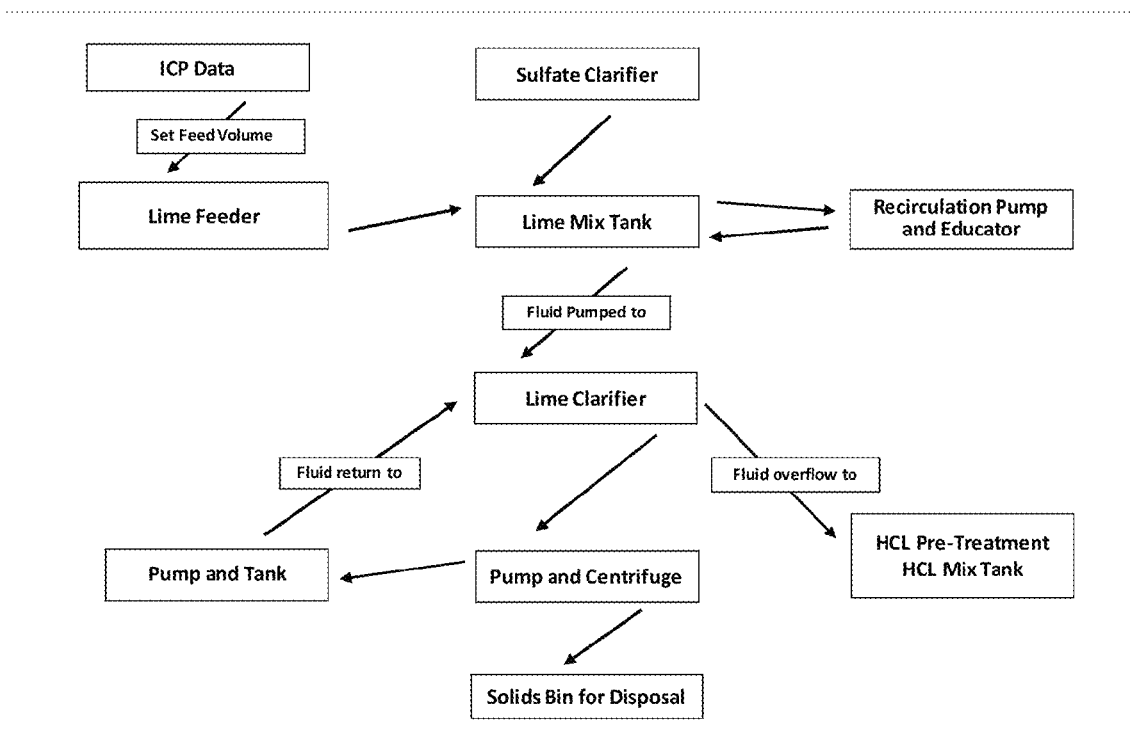
FIG. 4 is a process flow diagram through components of the lime pretreatment process of an embodiment of the disclosed technology.

To remove other impurities, such as iron, manganese and magnesium, as well as other metals, the alkalinity of the water may be adjusted to above 10 pH by adding lime, for example, in a mix tank (see FIG. 4), wherein the mix tank comprises a feeder set to deliver lime to the tank. At this higher alkalinity level (by the addition of lime, for example) exchanges metals to calcium ions; carbon ions are also removed by increasing pH, leaving chloride ions in solution. The amount of lime required to adjust the water to above 10 pH for any particular batch may be determined in the laboratory testing as hereinabove described. A mixing pump and eductors circulate the tank to mix and provide the agitation to react the hydroxide ions in the lime with various metal precipitates.

Figure 5:
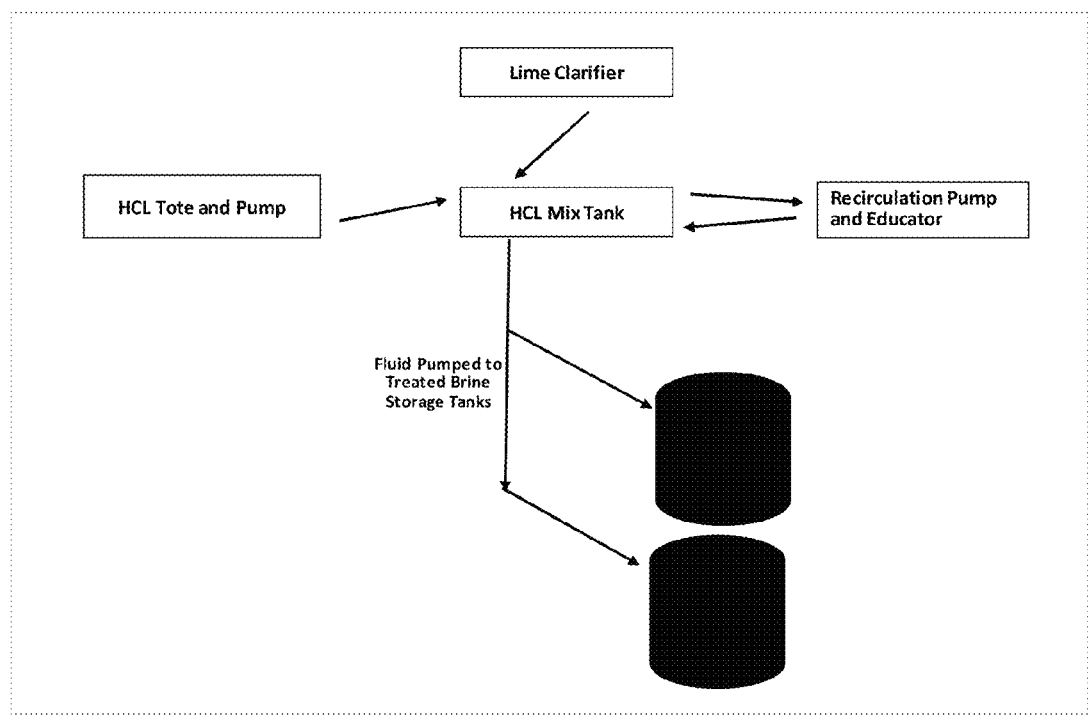
FIG. 5 is a process flow diagram through components of the hydrochloric acid pretreatment process of an embodiment of the disclosed technology.

After the metals and carbonates have precipitated and can be removed (by means of a feed pump and clarifier, as well as a centrifuge), the pH of the water in this pretreatment stage may be adjusted lower by hydrochloric acid, for example, in another mix tank (see FIG. 5). A mixing pump and eductors within this tank mix the water and hydrochloric acid to lower the pH levels to the range of 6.5-7.5.

The treated source water may now be transitioned to the final storage tank, which tank provides for recirculation (by means of recirculating pumps, for example) to ensure a homogeneous mixture for use in the reaction chamber to remove the sodium chloride, as hereinabove described.

While various pretreatment methods have been referenced, the foregoing is not intended to be a comprehensive list of all pretreatment methods, methods of pretreating water, or systems to accomplish the same, suitable for use with the disclosed technology. The apparatus shown (e.g., FIGS. 2-5) and described herein for pretreatment of the source water are in fluid communication, by means of pipes, pumps, augers, or other components.

The disclosed technology is most efficient when source water has a total salt (sodium chloride and calcium chloride) concentration of between about 9-30% w/w, or between about 15-20% w/w. Therefore, a coriolis flow meter or similar technology may be incorporated into the final tank holding the pre-treated water to measure the density of the water. Alternatively, other mass flow meters and density measuring devices may be used. Specifically, in an embodiment a coriolis flow meter is coupled with the final water storage tank or pond to measure and record volumes and density of source water in the pond from time to time. Alarms may be coupled with the coriolis flow meter to notify out of range fluids (for example, salt concentration above 30%, or below 9%), so that out-of-range source water may be blended with other source water to achieve the desired levels of salt in solution.

Applicant has conducted many studies to understand the relationship of temperature versus the solubility of sodium chloride in a sodium chloride/calcium chloride mixed brine solution. These tests were conducted at temperatures starting in the range below the 94.5° C. as shown on FIG. 8 and continued until sodium chloride precipitate formation. Two laboratory examples of solubility tests to extend the data point temperatures are shown in the figure, using a salt mixture of 70% sodium chloride, 30% calcium chloride.

The first test started with a 32% w/w mixture of calcium chloride and sodium chloride, this solution was initially at 22° C. The solution was heated and brought to a slow boil, a thermometer was placed in the beaker to monitor temperature. When the solution reached 117.7° C., which is around 41% w/w salt contraction using calcium chloride as main the salt for estimating concentration, crystals of sodium chloride appeared in the beaker. These points are represented by hour glass shapes on FIG. 8.

The second test was conduct on a 35% w/w mixture of calcium chloride and sodium chloride, this solution was initially a 22° C. This solution was heated and brought to a slow boil, a thermometer was placed in a beaker to monitor temperature. No sodium chlorides crystals had formed when the target temperature of 126.6° C. was reached. This test was conducted to simulated the expected optimum heat load and equipment design temperature limits. These points are shown in FIG. 8 as hour glass shapes.

Figure 8:
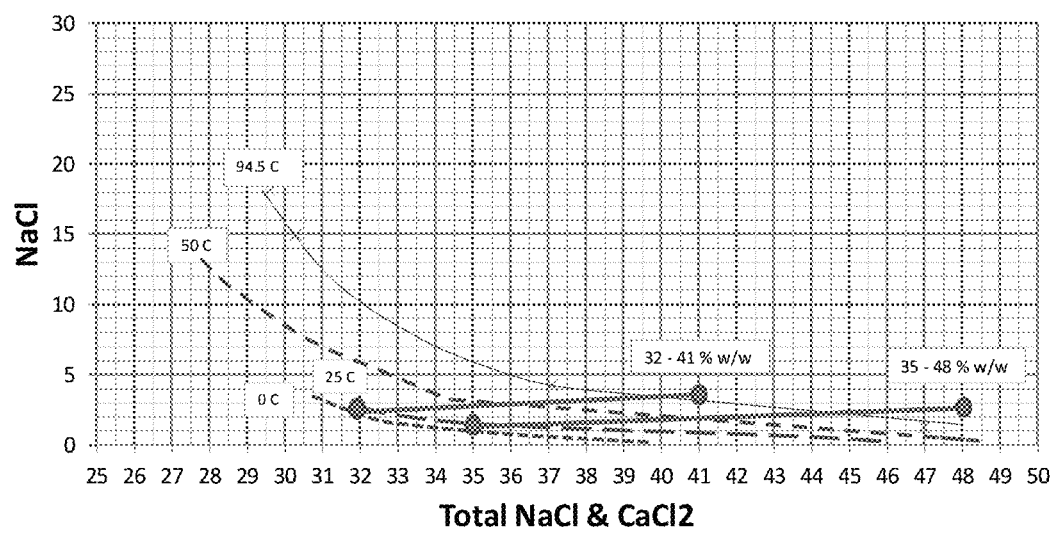
FIG. 8 shows solubility limits in a sodium chloride-calcium chloride mixture.

FIG. 8 shows that the extended points from the two tests provided in this report are reasonable. A line representing the 94.5° C. equilibrium between sodium chloride and calcium chloride in a mixed solution. These two tests also show that multiple design points for concentrating a solution of sodium chloride and calcium chloride without causing precipitation exist. The two main factors in removing the maximum amount of water while precipitating sodium chloride is the starting temperature (70° C.-150° C.) and the total salt concentrations. Test 1 only allowed for a concentration increase of 9% w/w and Test 2 shows a 13% w/w increase when starting at the same temperature.

From this second test, applicant asserts that a 48% w/w total salt concentration includes about 3.5% sodium chloride and 44.5% calcium chloride, at elevated temperatures (e.g., 126.6° C.). Therefore, a 35% w/w total salt concentration may include about 1.5% sodium chloride and 33.5% calcium chloride, at 22° C. It is possible to take the 48% w/w concentration, add a mixed brine solution of sodium chloride and calcium chloride and dilute the total concentration down to 35%, while allowing the mixture to cool to 22° C., and sodium chloride would be precipitate from solution and have the same chemical footprint of 33.5% calcium chloride and 1.5% sodium chloride. Under a material balance, a 35% w/w solution of sodium chloride and calcium chloride when heated and boiled to a 48% w/w concentration contains the same mass of sodium chloride and calcium chloride (the increase in concentration being attributable to the amount of water evaporated in the boiling process). Lowering the mass of water is what changes the concentration percent weight calculation of salt weight versus total fluid weight calculation.

As regards mix ratio and process throughput variability, it is anticipated that as between two solutions if the ratio of sodium chloride and calcium chloride in the pretreated source water, but the first solution has more total salt concentration than the second concentration, at the same dewatering rate, then the first solution will result in a higher volume of sodium chloride crystals, diluted calcium chloride, and source water feed rate, resulting in a higher overall daily throughput. If the two pretreated source water batches have the same total salt concentration but the first has higher sodium chloride compared to the second, the first solution will have lower diluted calcium chloride and a lower feed rate, resulting in lower overall daily throughput.

Based upon the foregoing, the following table represents the expected treatment volume, product volumes, and mixing rations of a pretreated mixed brine with a salt content comprising 70% sodium chloride and 30% calcium chloride.

| Total Mix Salt Concentration (%) | Mixed Salt Treatment Volume (bpd) | Clean Water gpm | Solid NaCl gpm | Liquid 35% CaCl2 gpm | Total gpm | Mixing Ratio New Feed/ 48% CaCl2 |
|---|---|---|---|---|---|---|
| 9 | 2,999 | 78.4 | 2.7 | 6.4 | 87.5 | 0.554 |
| 10 | 3,040 | 78.4 | 3.0 | 7.2 | 88.7 | 0.561 |
| 11 | 3,086 | 78.4 | 3.4 | 8.2 | 90.0 | 0.570 |
| 12 | 3,131 | 78.4 | 3.8 | 9.1 | 91.3 | 0.578 |

-continued

| Total Mix Salt Concentration (%) | Mixed Salt Treatment Volume (bpd) | Product Volumes | | | | Mixing Ratio New Feed/ 48% CaCl2 |
|---|---|---|---|---|---|---|
| | | Clean Water gpm | Solid NaCl gpm | Liquid 35% CaCl2 gpm | Total gpm | |
| 13 | 3,177 | 78.4 | 4.2 | 10.1 | 92.7 | 0.587 |
| 14 | 3,226 | 78.4 | 4.6 | 11.1 | 94.1 | 0.596 |
| 15 | 3,277 | 78.4 | 5.1 | 12.1 | 95.6 | 0.605 |
| 16 | 3,330 | 78.4 | 5.5 | 13.2 | 97.1 | 0.615 |
| 17 | 3,386 | 78.4 | 6.0 | 14.3 | 98.8 | 0.625 |
| 18 | 3,444 | 78.4 | 6.5 | 15.5 | 100.5 | 0.636 |
| 19 | 3,505 | 78.4 | 7.0 | 16.8 | 102.2 | 0.647 |
| 20 | 3,569 | 78.4 | 7.6 | 18.1 | 104.1 | 0.659 |
| 21 | 3,636 | 78.4 | 8.2 | 19.5 | 106.1 | 0.671 |
| 22 | 3,707 | 78.4 | 8.8 | 20.9 | 108.1 | 0.684 |
| 23 | 3,781 | 78.4 | 9.4 | 22.5 | 110.3 | 0.698 |
| 24 | 3,860 | 78.4 | 10.1 | 24.1 | 112.6 | 0.712 |
| 25 | 3,931 | 78.4 | 10.7 | 25.6 | 114.7 | 0.726 |

The foregoing technology differs from current crystallization processes by the external mixing of the concentrated calcium chloride with the pretreated source water, wherein the sodium chloride crystals are created inside an open top tank external from the evaporative process of removing the water. The reaction and clarifier/settling tank(s) precipitate and capture the sodium chloride crystals. Therefore, the present technology allows for significantly lower capitalization costs than typical crystallizers, because a wider range of heat exchangers can be used since crystals are not formed.

The invention claimed is:

1. A method of removing sodium chloride from production water or fracking water produced in an oil and gas well operation, wherein the production or fracking water comprises sodium chloride, the method comprising the steps of:
   a. removing the sodium chloride from the mixture by a method consisting of the steps: (1) adding a calcium chloride feed to the production or fracking water to create a mixture, wherein the calcium chloride is added in an amount so that the calcium chloride present in the mixture is between about 31% w/w and 48% w/w of the mixture, (2) agitating the mixture, (3) settling the agitated mixture to cause sodium chloride to precipitate out of the mixture, and (4) removing the precipitated sodium chloride from the mixture, and
   b. after the sodium chloride has been removed from the mixture, dewatering at least a portion of the mixture so that calcium chloride is present in the dewatered mixture in an amount less than 75% w/w, wherein the dewatered mixture is used as the calcium chloride feed of method step (a).

2. The method of claim 1, wherein the production or fracking water has an aggregate concentration of sodium chloride and calcium chloride of between about 9-30% w/w.

3. The method of claim 1, further comprising the step of determining the concentration of calcium chloride in the production or fracking water to calculate the amount of calcium chloride feed to add to the mixture so that the calcium chloride present in the mixture is between about 31% and 48% w/w.

4. The method of claim 3, wherein the concentration of calcium chloride in the production or fracking water is measured by determining the density and temperature of the water.

5. The method of claim 1, wherein the production or fracking water is provided as a homogeneous mixture.

6. The method of claim 1, wherein additional calcium chloride feed is added to the mixture to maintain the calcium chloride present in the mixture between about 31% w/w and 48% w/w of the mixture.

7. The method of claim 1, wherein the dewatered mixture comprises calcium chloride in an amount between 43%-55% w/w at ambient temperatures.

8. The method of claim 1 further comprising the step of pretreating the production or fracking water to remove solids and impurities before adding calcium chloride feed, wherein the pretreatment method is selected from the group consisting of desludging, de-oiling, pre-treatment and brine conditioning, chemical treatment, and combinations thereof.

9. The method of claim 1, wherein the step of dewatering at least a portion of the mixture comprises evaporation.

* * * * *